Patented Oct. 21, 1947

2,429,397

UNITED STATES PATENT OFFICE 2,429,397

METHOD OF ADHERING FIBERS TO RUBBER

Jack Compton, Cuyahoga Falls, and Matthew W. Wilson, Akron, Ohio, assignors to The B. F. Goodrich Company, New York, N. Y., a corporation of New York No Drawing. Application April 27, 1943, Serial No. 484,778

8 Claims. (Cl. 154—92)

This invention relates to the adhesion of rubber materials to fibrous materials such as yarns, cords, and fabrics made of cotton, silk, rayon, nylon, glass and other natural and synthetic fiber-forming materials.

The length of service of many articles of commerce embodying rubber materials and fibrous materials in adhering relation such as tires and belts, for instance, is largely dependent upon the degree of adhesion obtained between the rubber and the fibers. As a result the art has continually searched for new and improved methods of increasing the adhesion. The object of this invention, accordingly, is to provide a method whereby a remarkable improvement in adhesion between rubber materials and fibrous materials may be obtained.

It has previously been proposed to improve the adhesion of rubber to rayon by first treating the rayon with an aqueous dispersion comprising natural rubber latex and a phenol-aldehyde resin obtained by condensing a phenol and an aldehyde in an aqueous solution in the presence of sodium or potassium hydroxide, drying the treated rayon and then incorporating it in rubber.

When synthetic rubber latex of the type prepared by the copolymerization in aqueous emulsion of butadiene-1,3 and a copolymerizable mono-olefinic compound is substituted for natural latex in this treatment, however, it has been found that little if any improvement in adhesion is obtained.

We have now discovered a method whereby remarkable adhesion between rubber materials and fibrous materials may be obtained by the use of aqueous dispersions comprising such synthetic latices and phenolaldehyde resins. This method consists in treating fibrous materials with an aqueous dispersion prepared by first partially polymerizing or condensing a phenol and an aldehyde in aqueous solution in the presence of a synthetic latex prepared by the copolymerization in aqueous emulsion of a butadiene-1,3 hydrocarbon and a copolymerizable mono-olefinic compound, and then adding an excess of a nitrogeneous base, such as ammonia, to the dispersion. The fibrous material so treated is then dried and incorporated in a rubber material.

Before describing the invention in detail the nature of the fibrous materials treated and of the rubber materials to which the fibrous materials are adhered will be more particularly set forth. As mentioned above, the fibrous material may consist of yarns, cords, or fabric comprising naturally occurring fibers such as cotton, silk, ramie, and other bast-fibers and the like, or fibers of synthetic organic fiber-forming materials such as rayon, by which is meant regenerated cellulosic materials whether made by the viscose, cuprammonium or other process, nylon, by which is meant synthetic linear polyamides such as polyhexamethylene adipamide, and other synthetic fiber-forming polymers or resins as well as fibrous materials prepared from glass, metals, and other materials.

The rubber material to which the fibrous material is adhered may be any of the naturally occurring rubber materials such as caoutchouc, guayule, gutta percha and the like; any of the various synthetic rubbers such as polymers of butadiene-1,3, isoprene, 2-chlorobutadiene-1,3, and the like, copolymers of butadiene-1,3 with styrene, acrylonitrile, methyl methacrylate, isobutylene, etc.; reclaimed natural or synthetic rubbers and other vulcanizable rubbery materials.

The rubber material used is preferably natural rubber, reclaimed natural rubber or a rubbery butadiene-1,3 styrene copolymer when the synthetic latex present in the dispersion used to treat the fibrous material is a butadiene-1,3 styrene latex; and is preferably a butadiene-1,3 acrylonitrile copolymer when the fibrous material is treated with a latex containing this synthetic rubber. The rubber materials may contain any desired pigments, reinforcing agents, softeners, vulcanizers, accelerators, antioxidants or other compounding ingredients.

In the practice of the invention the fibrous materials are treated in any desired manner with an aqueous dispersion of the type hereinafter described, are then dried and incorporated in an unvulcanized rubber composition. The rubber composition is then vulcanized whereby remarkably increased adhesion between the fibrous material and the rubber is effected. Treatment of the fibrous materials with the aqueous dispersion, drying of the treated fibrous material and incorporation of the dried treated fibrous material in the rubber composition may all be accomplished in the manner well known to the art.

The aqueous dispersion with which the fibrous material is treated and its method of preparation are the critical features of the present invention. The treating dispersion is preferably prepared by admixing a synthetic latex obtained by the copolymerization in aqueous emulsion of a butadiene-1,3 hydrocarbon and a copolymerizable mono-olefinic compound, with a phenol and an aldehyde which are capable of condensing, polymerizing or setting-up to form a heat-hardening phenol-aldehyde resin, allowing partial condensation or polymerization of the phenol and aldehyde to occur and then adding a nitrogenous base. However, the phenol and aldehyde may be allowed partially to condense before adding the synthetic latex, if desired, it being essential only that partial polymerization or condensation occur before addition of the nitrogenous base. Either of these procedures is believed to result in the formation of a different type of resin than the ordinary phenol-aldehyde resin, which resin is believed responsible at least in part for the remarkable adhesion obtained.

The synthetic latices which may be used include any of the latices prepared by the copolymerization in aqueous emulsion of a mixture of a butadiene-1,3 hydrocarbon including butadiene-1,3 itself as well as its hydrocarbon homologs which polymerize in the same manner such as isoprene, 2,3-dimethyl butadiene-1,3 and piperylene, and at least one copolymerizable mono-olefinic compound (that is, a copolymerizable compound containing a single >C=< group) such as styrene, acrylonitrile, methyl methacrylate, methyl acrylate, methacrylonitrile, acrylamide, vinyl naphthalene, methyl vinyl ketone, methyl vinyl ether, vinyl furane, vinyl acetate, isobutylene and the like. As mentioned above, the preferred latices are those prepared by the copolymerization of butadiene-1,3 and styrene in an aqueous emulsion when the treated fibrous material is to be adhered to natural rubber or this type of synthetic rubber. Such latices will ordinarily contain a saponaceous material such as a fatty acid soap present to the extent of about 1 to 5% on the latex as the emulsifying agent and may also contain about 1 to 4% of an antioxidant in addition to the dispersed rubbery copolymer which is ordinarily present in a concentration of from 15 to 50% of the total latex. These concentrations, however, are not critical and may be varied if desired.

In the preparation of the fiber-treating dispersion such latices are mixed with a phenolic compound and an aldehyde which are capable of condensing or polymerizing to form a heat-hardening phenol-aldehyde resin. The preferred phenolic compounds are appreciably water-soluble polyhydric phenols having hydroxyl groups in meta relationship such as resorcinol, phloro-glucinol, orcinol, cresorcinol and m-xylorcinol although other polyhydric phenols and even monohydric phenols such as phenol itself may also be employed. The preferred aldehyde is formaldehyde, or its polymers, although other appreciably water-soluble aldehydes such as acetaldehyde or furfural may be substituted wholly or in part for the formaldehyde. The concentration of the phenol and the aldehyde is preferably from 1 to 10% of each on the total amount of the dispersion but this may be varied somewhat if desired.

Since the presence of alkalies such as sodium and potassium hydroxide catalyzes the polymerization or condensation of the phenol and the aldehyde to form the resin, these may be present in the dispersion together with the synthetic latex, the phenol and the aldehyde, if desired, but this is not essential. It is essential, however, that the phenol and aldehyde be allowed partially to polymerize or condense before the addition of the nitrogenous base. This may be accomplished simply by allowing an aqueous solution of the phenol and aldehyde to stand at room temperature either in the presence or absence of the synthetic latex for about 4 to 24 hours or an even shorter time when temperatures in excess of room temperature are employed. It is preferred to conduct this partial polymerization or condensation by allowing the mixture to stand at temperatures lower than about 50° C.

After partial polymerization or condensation of the phenol and aldehyde and addition of the synthetic latex, a nitrogenous base is then added to the dispersion. Ammonia or ammonium hydroxide is the preferred nitrogenous base although other nitrogenous bases such as the primary, secondary, and tertiary organic amines may also be used. The amount of ammonia or other nitrogenous base added may be varied within wide limits but it is preferred to add an amount in excess of that which is equivalent to the amount of phenol and aldehyde present in the dispersion. The dispersion containing the partially polymerized phenol and aldehyde, the synthetic latex and the added ammonia is then ready for use in treating fibrous materials. It is often desirable, however, to allow the dispersion to stand for a further length of time in order that the phenol and aldehyde may further condense or that the ammonia may react with the other materials present to form a resinous material, before treating the fibrous material with the dispersion.

As an example of the method of this invention a dispersion for treating fibrous materials was prepared by mixing 600 parts by weight of a synthetic latex obtained by the polymerization in aqueous emulsion of a mixture of 70 parts of butadiene-1,3 and 30 parts of styrene and containing approximately 5% soap and 20% of dispersed synthetic rubber, with 90 parts by weight of an aqueous solution containing 30 parts of resorcinol and 60 parts of a 40% formaldehyde solution. The mixture was allowed to stand at room temperature (about 25° C.) for 18 hours in order that partial polymerization or condensation of the phenol and aldehyde might occur. There was then added to the mixture 75 parts of a 14% ammonium hydroxide solution and the mixture was allowed to stand for another hour at room temperature. The dispersion was then heated to 80° C. and a rayon tire cord was dipped in the heated dispersion for about 10 seconds. The treated cord was then thoroughly dried in hot air at 85° C. under tension to remove the moisture and harden the coating. The treated cord was then incorporated in an unvulcanized natural rubber composition and the composition vulcanized. When the resulting composite structure was tested to determine the adhesion between the rubber and the rayon it was found that a 542% increase in adhesion over a similar untreated rayon cord was obtained. When the rayon cord was treated in the usual manner with a dispersion obtained by mixing a resorcinol-formaldehyde resin solution prepared by condensing resorcinol and formaldehyde in the presence of sodium hydroxide with the same synthetic latex in the absence of ammonia and basic amines less than a 200% increase in adhesion over an untreated cord was obtained.

Similar remarkable increased adhesion may be obtained by suitable variations in the above example in accordance with the disclosure. Hence, it is not intended that the invention be limited by the specific example but only by the spirit and scope of the appended claims.

We claim:

1. In a method of improving the adhesion of a fibrous material to a rubber material, the step which comprises treating the fibrous material, prior to bringing it in adhering relation with the rubber material, with an aqueous dispersion prepared by adding a nitrogenous base to a mixture of an aqueous solution of a partially condensed phenol aldehyde resin and a synthetic latex obtained by the emulsion copolymerization of a butadiene-1,3 hydrocarbon and a copolymerizable mono-olefinic compound.

2. In a method of improving the adhesion of a fibrous material to a rubber material, the step which comprises treating the fibrous material, prior to bringing it in adhering relation with the rubber material, with an aqueous dispersion prepared by adding ammonia to a mixture of an aqueous solution of a resin obtained by the partial condensation of a polyhydric phenol with an aldehyde and a synthetic latex obtained by the emulsion copolymerization of butadiene-1,3 and styrene.

3. In a method of making a composite product by incorporating rayon cords in a vulcanizable rubber material and then vulcanizing the rubber material, the additional steps which comprise treating the cords with an aqueous dispersion prepared by adding ammonia to a mixture of an aqueous solution of a resin obtained by the partial condensation of a polyhydric phenol and an aldehyde, and a synthetic latex prepared by the emulsion copolymerization of butadiene-1,3 and styrene, and drying the treated cords before incorporating the cords in the rubber material.

4. In a method of making a composite product by incorporating a fibrous material in a vulcanizable rubber material and then vulcanizing the rubber material, the additional steps which comprise treating the fibrous material with an aqueous dispersion prepared by mixing resorcinol and formaldehyde with a synthetic latex obtained by the emulsion copolymerization of butadiene-1,3 and styrene, allowing the resorcinol and formaldehyde partially to condense to form a resin and then adding ammonia to the mixture, and drying the treated fibrous material before incorporating the fibrous material in the rubber material.

5. In a method of improving the adhesion of rayon to rubber, the step which comprises treating the rubber prior to bringing it in adhering relation with the rubber with an aqueous dispersion prepared by adding ammonia to an aqueous dispersion containing a partially condensed phenol-aldehyde resin and a synthetic latex obtained by the emulsion copolymerization of butadiene-1,3 and styrene.

6. The method of claim 5 wherein the phenol-aldehyde resin is a resorcinol-formaldehyde resin.

7. A composite product comprising a rubber material and rayon in adhering relation, the rayon having been treated in accordance with claim 3.

8. A composite product comprising a rubber material and a fibrous material in adhering relation, the fibrous material having been treated in accordance with claim 4.

JACK COMPTON.
MATTHEW W. WILSON.

REFERENCES CITED

The following references are of record in the file of this patent:

UNITED STATES PATENTS

| Number | Name | Date |
|---|---|---|
| 2,128,229 | Charch et al. | Aug. 30, 1938 |
| 2,188,283 | Mauchester | Jan. 23, 1940 |
| 2,211,945 | Charch | Aug. 20, 1940 |
| 2,211,948 | Hershberger | Aug. 20, 1940 |
| 2,211,959 | Maney | Aug. 20, 1940 |
| 2,235,625 | Wolfe | Mar. 18, 1941 |
| 2,314,976 | Gaydik et al. | Mar. 30, 1943 |

Certificate of Correction

Patent No. 2,429,397.                                                October 21, 1947.

JACK COMPTON ET AL.

It is hereby certified that error appears in the printed specification of the above numbered patent requiring correction as follows: Column 3, line 22, for "a single $>C=<$ group" read a single $>C=C<$ group and that the said Letters Patent should be read with this correction therein that the same may conform to the record of the case in the Patent Office.

Signed and sealed this 15th day of June, A. D. 1948.

[SEAL]

THOMAS F. MURPHY,
*Assistant Commissioner of Patents.* rubber material, with an aqueous dispersion prepared by adding a nitrogenous base to a mixture of an aqueous solution of a partially condensed phenol aldehyde resin and a synthetic latex obtained by the emulsion copolymerization of a butadiene-1,3 hydrocarbon and a copolymerizable mono-olefinic compound.

2. In a method of improving the adhesion of a fibrous material to a rubber material, the step which comprises treating the fibrous material, prior to bringing it in adhering relation with the rubber material, with an aqueous dispersion prepared by adding ammonia to a mixture of an aqueous solution of a resin obtained by the partial condensation of a polyhydric phenol with an aldehyde and a synthetic latex obtained by the emulsion copolymerization of butadiene-1,3 and styrene.

3. In a method of making a composite product by incorporating rayon cords in a vulcanizable rubber material and then vulcanizing the rubber material, the additional steps which comprise treating the cords with an aqueous dispersion prepared by adding ammonia to a mixture of an aqueous solution of a resin obtained by the partial condensation of a polyhydric phenol and an aldehyde, and a synthetic latex prepared by the emulsion copolymerization of butadiene-1,3 and styrene, and drying the treated cords before incorporating the cords in the rubber material.

4. In a method of making a composite product by incorporating a fibrous material in a vulcanizable rubber material and then vulcanizing the rubber material, the additional steps which comprise treating the fibrous material with an aqueous dispersion prepared by mixing resorcinol and formaldehyde with a synthetic latex obtained by the emulsion copolymerization of butadiene-1,3 and styrene, allowing the resorcinol and formaldehyde partially to condense to form a resin and then adding ammonia to the mixture, and drying the treated fibrous material before incorporating the fibrous material in the rubber material.

5. In a method of improving the adhesion of rayon to rubber, the step which comprises treating the rubber prior to bringing it in adhering relation with the rubber with an aqueous dispersion prepared by adding ammonia to an aqueous dispersion containing a partially condensed phenol-aldehyde resin and a synthetic latex obtained by the emulsion copolymerization of butadiene-1,3 and styrene.

6. The method of claim 5 wherein the phenol-aldehyde resin is a resorcinol-formaldehyde resin.

7. A composite product comprising a rubber material and rayon in adhering relation, the rayon having been treated in accordance with claim 3.

8. A composite product comprising a rubber material and a fibrous material in adhering relation, the fibrous material having been treated in accordance with claim 4.

JACK COMPTON.
MATTHEW W. WILSON.

REFERENCES CITED

The following references are of record in the file of this patent:

UNITED STATES PATENTS

| Number | Name | Date |
|---|---|---|
| 2,128,229 | Charch et al. | Aug. 30, 1938 |
| 2,188,283 | Mauchester | Jan. 23, 1940 |
| 2,211,945 | Charch | Aug. 20, 1940 |
| 2,211,948 | Hershberger | Aug. 20, 1940 |
| 2,211,959 | Maney | Aug. 20, 1940 |
| 2,235,625 | Wolfe | Mar. 18, 1941 |
| 2,314,976 | Gaydik et al. | Mar. 30, 1943 |

Certificate of Correction

Patent No. 2,429,397.   October 21, 1947.

JACK COMPTON ET AL.

It is hereby certified that error appears in the printed specification of the above numbered patent requiring correction as follows: Column 3, line 22, for "a single $\diagup_{\diagdown}C=\diagdown_{\diagup}$ group" read a single $\diagup_{\diagdown}C=C\diagdown_{\diagup}$ group and that the said Letters Patent should be read with this correction therein that the same may conform to the record of the case in the Patent Office.

Signed and sealed this 15th day of June, A. D. 1948.

[SEAL]

THOMAS F. MURPHY,
*Assistant Commissioner of Patents.*